Dec. 3, 1957 J. L. KIMBALL Re. 24,398
HOT AND COLD WATER MIXING CONTROL
Original Filed June 25, 1952
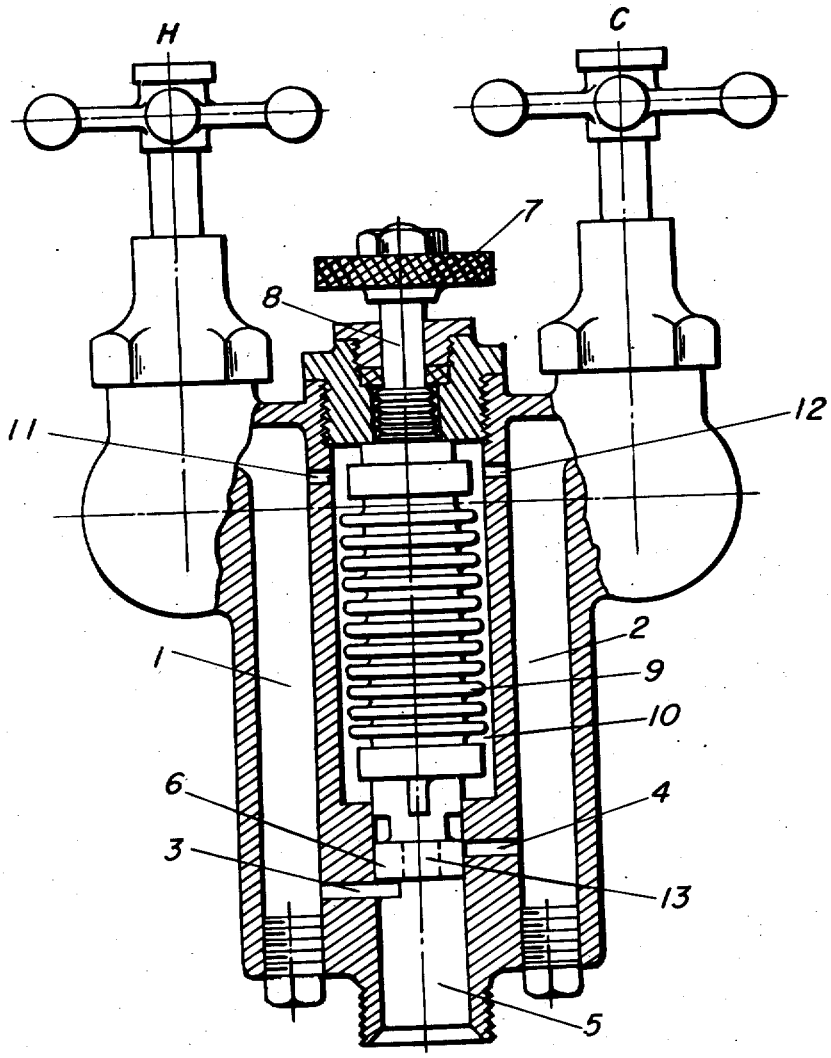
James L. Kimball United States Patent Office Re. 24,398
Reissued Dec. 3, 1957

24,398

HOT AND COLD WATER MIXING CONTROL

James L. Kimball, Danvers, Mass., assignor, by mesne assignments, to American Radiator & Standard Sanitary Corporation, New York, N. Y., a corporation of Delaware Original No. 2,753,118, dated July 3, 1956, Serial No. 295,432, June 25, 1952. Application for reissue January 16, 1957, Serial No. 634,596

6 Claims. (Cl. 236—12)

Matter enclosed in heavy brackets [ ] appears in the original patent but forms no part of this reissue specification; matter printed in italics indicates the additions made by reissue.

My invention relates to the regulation of temperature of fluids and more particularly, though not exclusively, to the regulation of two fluid streams of different temperatures to maintain a substantially uniform temperature in a common delivery outlet, as for example, hot and cold water mixing control for bathing in the home or in hospitals and like institutions where sick or mental cases are treated.

The principal object of my invention is to avoid oscillatory control in the mixing of two fluids of different temperatures. A further object is to provide control apparatus having definite temperature control limits.

In cases where the control of the hot water is available to children or to patients in hospitals or other like institutions then there is danger of injury by scalding with water of high temperatures. My invention avoids this risk by first avoiding oscillatory control and secondly by placing a definite control limit on the upper temperatures.

In hot and cold water mixing control the hot water is much hotter than required for normal use, furthermore the temperature may vary widely, consequently it is not a safe practice to draw water of alternate hot and cold quantities, or to have no limit of control over the temperature.

With this understanding applicant has devised a novel means for sampling the average temperature of the two fluid streams and from the result of this sampling operation, control the relative flow of the hot and cold water in accordance with the required temperature.

Another novel feature of the invention is the interposing of the thermostatic element between the control valve and the manual control means whereby either can change the relation of the flow valve to vary the respective flows of the hot and cold water.

Referring to the drawing H is the hot water supply valve and C the cold water supply valve. The two component streams of hot and cold water flow downward through *passageways or* channels 1 and 2, thence through apertures 3 and 4 to a [common delivery outlet 5.] *mixing chamber 5 having a discharge outlet through which the mixed hot and cold water is delivered.* The respective flows through apertures 3 and 4 [is] *are* governed by flow valve 6. A manual positioning control 7 has a screw adjustment stem 8. Interposed between *stem* 8 and valve 6, and operatively attached to both, is a thermostatic element 9. This thermostatic element is located between the hot and cold water channels 1 and 2 in what will be referred to as a *monitor or* sampling chamber 10. At the upper end of this chamber, ports 11 and 12 connect respectively to the hot and cold water channels 1 and 2. While the drawing shows these ports 11 and 12 as being on the line of cross section, in practice these ports are drilled at an angle in such a way as to give a swirling motion to the hot and cold water, in the same direction, and thereby more uniformly obtain an average temperature of the two streams within the sampling chamber.

[When the hot and cold water is turned on, the pressures being the same, equal amounts of hot and cold water enter the sampling chamber, this mixes and flows downward around thermostat 9 passing the guide webs formed at the upper end of valve 6 to the common outlet 5 through orifice 13 in valve 6 as shown in dotted lines, which also acts as the delivery port for cold water flow from aperture 4. Orifice 13 should be of sufficient size to pass the full flow from channel 2 including that from parts 11 and 12, while a single orifice is indicated in drawing, a series of drilled holes may be employed if found more convenient.]

*When the hot and cold water is turned on, the pressures being the same, equal amounts of hot and cold water enter the sampling chamber 10. The hot and cold water mixes and flows downward around thermostat 9, passing the guide webs formed at the upper end of valve 6, through passage or orifice 13 in the lower end of valve 6 to the mixing chamber 5, and then out the discharge outlet of the latter. The orifice 13 also acts as the delivery port for cold water flow from aperture 4. Orifice 13 should be of sufficient size to pass the full flow from channel 2 including that from ports 11 and 12. While a single orifice is indicated in the drawing, a series of drilled holes may be employed if found more convenient.*

In the operation of my invention, if the outgoing water is not of the required temperature then a manual adjustment of valve 6 is made to bring this about [, thereafter]. *Thereafter* should the temperature change in either the hot or cold water supply entering the sampling chamber 10, the flow control valve 6 will be thermostatically regulated to vary the relative flows to maintain the outgoing water at the original set temperature.

In my invention a relatively sensitive thermostat is made possible by its location in a sampling chamber, independent of abrupt changes in the principal flowing quantities, thus permitting [of] a relatively narrow range of temperature control. After being adjusted for the required temperature the thermostat makes the necessary corrections by slightly closing one of the apertures and opening the other as the change may require.

Either of these apertures *3 and 4* should be capable of passing the entire volume requirements, meaning that when the control valve *6* is in a neutral position *and the water pressures in channels 1 and 2 are substantially the same*, there will be substantially equal flow from [each of] the two apertures. In the interest of sensitivity the apertures should be relatively narrow [, this]. *This* minimizes the required movement of the thermostat for a full flow in either of two directions.

It is preferable to keep ports 11 and 12 relatively small as a slow flow through the sampling chamber *10* gives a better mixing operation, [also] *and* more time *is provided* for the thermostat to absorb and radiate the heat change, thereby avoiding over-correction in the control of the two main streams.

It should be understood that the control valve 6 must be manually positioned for the required temperature [, thereafter]. *Thereafter*, the thermostat takes over and makes corrections for any variation in temperature of the two main streams of hot and cold water.

[Applicant's] *The present* invention avoids sudden changes [of hot and cold] *in temperature of water in the sampling chamber* and consequent over correction, thereby permitting [of] stabilized control at near the point of ultimate sensitivity.

In my invention time lag can not act as a sustaining factor in causing oscillatory control, as the response lag in one direction has no influence in causing an over correction in the opposite direction. Oscillations of a constant magnitude are sustained by response lag of the controlling means causing an over correction in first one and then the other flowing quantities. In this way the lag is intermittent first in one direction and then in the other. In my invention the flow is not reversed within the sampling chamber and consequently there are no wide variations in the absorption and radiation of heat within the thermostat and adjustments are only such as are due to the variations of the temperature of the incoming water.

From the foregoing it will be seen that in the conventional mixing valve control, it is the inability of the thermostat to follow abrupt changes in the flowing quantities which start the hunting cycle, and once started, the same lack of instantaneous response sustains the oscillation. In [applicant's] *the present* invention, the thermostat is not subject to any abrupt changes, consequently over corrections are held to a minimum. It will now be seen by those skilled in the art that I have invented novel control means for apportioning the respective flows of fluids of different temperatures to maintain a combined flow of a [substantial] *substantially* uniform temperature. While my invention has been described in connection with a specific embodiment, it is not confined thereto but is intended to cover such modifications thereof as fall within the scope of the appended claims.

I claim:

1. In a hot and cold water mixing control, comprising in combination, a cylindrical chamber, channels on opposite sides thereof for passing water at different temperatures, apertures connecting said channels with said chamber, said apertures consisting of narrow passages longitudinally arranged in parallel spaced relation, a piston valve [,] having an opening therethrough adapted to regulate the flow of said two streams through said apertures, said valve having a relatively neutral position in which substantially equal quantities of water of different temperatures [flows] *flow* to a common outlet and other flow positions in which varying quantities of water of different temperatures flow to said outlet, ports including continuous fixed openings of equal size connecting the delivery channels with said chamber at the up stream side of said apertures by means of which uniform quantities of hot and cold water are mixed and [flows] *flow* to the common outlet, thermostatic means responsive to variations in the average temperature within said chamber for operating said valve and manual means for positioning said valve in relation to said apertures for initially apportioning said two streams.

2. In a hot and cold water mixing control, in combination, a sampling chamber, hot and cold water flow channels on opposite sides thereof, apertures through which said hot and cold water flows to a common down stream outlet, said apertures consisting of narrow passages longitudinally arranged in spaced relation, a piston valve including an opening therethrough for the passage of water from said chamber, said valve having a relatively neutral position in which substantially equal quantities of hot and cold water [flows] *flow* to the common down stream outlet and other flow positions in which varying quantities of hot and cold water [flows] *flow* to said outlet, ports including continuous fixed openings of equal size connecting the said channels with said chamber at the upstream side of said apertures through which relatively uniform quantities of hot and cold water are mixed and flow to the common outlet, thermostatic means within said chamber responsive to variations in the average temperature of water flowing therethrough adapted to the operation of said valve and manual means to position said valve in relation to said apertures for initially apportioning the said two streams.

3. In a hot and cold water mixing control, comprising in combination, a sampling chamber, independent hot water and cold water channels on opposite sides thereof, apertures through which said hot and cold water streams [flows] *flow* to a common delivery outlet, said apertures consisting of narrow passages longitudinally arranged in parallel spaced relation, a sliding piston valve having an opening therethrough arranged to control the relative flow of said hot and cold water, ports including continuous fixed openings of equal size connecting said channels with said chamber at the upstream side of said apertures through which hot and cold water of substantially uniform amounts is mixed within said chamber and flows to the common delivery outlet, a thermostat in said chamber responsive to variations in the average temperature therein operatively connected with said valve, and manual operated means for jointly adjusting the position of said thermostat and said valve in relation to said apertures for initially apportioning said two streams.

*4. In a hot and cold fluid mixing device for delivering fluid at various desired temperatures, the combination of means forming a mixing chamber having spaced inlet apertures for hot and cold fluids and an outlet from which the mixed fluid can be delivered, separate passageways for hot and cold fluid leading into said mixing chamber through said apertures, means forming a monitor chamber having separate inlet ports in communication with respective ones of said passageways and an outlet orifice, said inlet ports each being in continuous communication with the monitor chamber whereby to provide minimum temperature variation in said monitor chamber, a valve element movably mounted in said mixing chamber for varying inversely the effective areas of the apertures so as to apportion the relative quantities of hot and cold fluids that can flow into said mixing chamber through the apertures, and a thermostatic power means in said monitor chamber operatively connected to said valve element for moving the latter in response to temperature of the fluid flowing through said monitor chamber.*

*5. In a hot and cold fluid mixing device for delivering fluid at various desired temperatures, the combination of means forming a mixing chamber having spaced inlet apertures for hot and cold fluid and an outlet from which the mixed water can be delivered, separate passageways for hot and cold fluids leading into said mixing chamber through said apertures, means forming a monitor chamber having separate inlet ports in communication with respective ones of said passageways and an outlet orifice, said inlet ports each being in continuous communication with the monitor chamber whereby to provide minimum temperature variation in said monitor chamber, a valve element movably mounted in said mixing chamber between said apertures for varying inversely the effective areas of the apertures so as to apportion relative quantities of hot and cold fluids that can flow into said mixing chamber through the apertures, a thermostatic means in said monitor chamber operatively connected to said valve element for moving the latter in response to temperature changes in said monitor chamber, and means to adjustably position at least one of the operatively connected valve element and thermostatic means to obtain a different desired temperature of the mixed fluid delivered from said mixing chamber.*

*6. In a hot and cold fluid mixing device, the combination of means forming a monitor chamber, means forming a cylindrical mixing chamber having a discharge outlet, said monitor chamber being located in alignment with the axis of the cylindrical mixing chamber, inlet passageways for hot and cold fluids communicating with said mixing chamber through apertures in the cylindrical side wall of the latter, a valve element slidably mounted in the mixing chamber and having a travel between the hot and cold apertures so as to inversely vary the effective areas of said apertures for apportioning the quantities of hot and cold fluids entering the mixing chamber through said apertures, said monitor chamber having inlet ports therein communicating with said passageways up-*

*stream of said apertures and having a discharge outlet, said inlet ports each being in continuous communication with the monitor chamber whereby to provide minimum temperature variation in said monitor chamber, and thermostatic means in said monitor chamber operatively connected to said valve element for moving the latter in response to temperature changes in said monitor chamber.*

References Cited in the file of this patent or the original patent

UNITED STATES PATENTS

| | | |
|---|---|---|
| Re. 19,488 | Russell | Mar. 5, 1935 |
| 1,022,188 | Geissinger | Apr. 2, 1912 |
| 2,569,838 | Vinson | Oct. 2, 1951 |

FOREIGN PATENTS

| | | |
|---|---|---|
| 70,835 | Austria | Jan. 10, 1916 |